United States Patent
Matsushita

(10) Patent No.: US 11,196,886 B2
(45) Date of Patent: Dec. 7, 2021

(54) IMAGE PROCESSING DEVICE, METHOD FOR DETERMINING SHEET ORIENTATION, AND SHEET

(71) Applicant: TOSHIBA TEC KABUSHIKI KAISHA, Tokyo (JP)

(72) Inventor: Naohiro Matsushita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/133,412

(22) Filed: Dec. 23, 2020

(65) Prior Publication Data

US 2021/0234982 A1    Jul. 29, 2021

(30) Foreign Application Priority Data

Jan. 28, 2020  (JP) ................. 2020-011479

(51) Int. Cl.
| | | |
|---|---|---|
| *G06F 3/12* | (2006.01) | |
| *H04N 1/00* | (2006.01) | |
| *H04N 1/32* | (2006.01) | |

(52) U.S. Cl.
CPC ....... *H04N 1/00721* (2013.01); *H04N 1/0057* (2013.01); *H04N 1/00275* (2013.01); *H04N 1/00315* (2013.01); *H04N 1/00342* (2013.01); *H04N 1/00485* (2013.01); *H04N 1/00761* (2013.01); *H04N 1/32138* (2013.01)

(58) Field of Classification Search
CPC ........... H04N 1/00721; H04N 1/00275; H04N 1/00315; H04N 1/00342; H04N 1/00485; H04N 1/0057; H04N 1/00761; H04N 1/32138
See application file for complete search history.

(56) References Cited

U.S. PATENT DOCUMENTS

2006/0017568 A1*  1/2006  Burdette ............... B41J 3/44
                                                    340/572.1

FOREIGN PATENT DOCUMENTS

| JP | 2004-284250 A | 10/2004 |
|---|---|---|
| JP | 2006-195065 A | 7/2006 |
| JP | 2008-065188 A | 3/2008 |

* cited by examiner

*Primary Examiner* — Moustapha Diaby
(74) *Attorney, Agent, or Firm* — Kim & Stewart LLP

(57) ABSTRACT

An image processing device includes a printing unit printing an image on a sheet including first and second tags. The first and second tags have first and second antennas extending along first and second directions. The device further includes a tag reading unit including a third antenna and configured to transmit, towards the sheet from the third antenna, first radio waves polarized in the first direction and second radio waves polarized in the second direction in each of a first period during which the sheet is conveyed towards the third antenna and a second period during which the sheet is conveyed away from the third antenna, and determine an orientation of the sheet based on intensities of third radio waves polarized in the first direction and fourth radio waves polarized in the second direction, which have been received by the third antenna in each of the first and second periods.

20 Claims, 12 Drawing Sheets

FIG. 12C

| CONDITION | DETERMINATION RESULT |
|---|---|
| F1 < B1 AND F2 > B2 | A DIRECTION |
| F1 > B1 AND F2 < B2 | B DIRECTION |

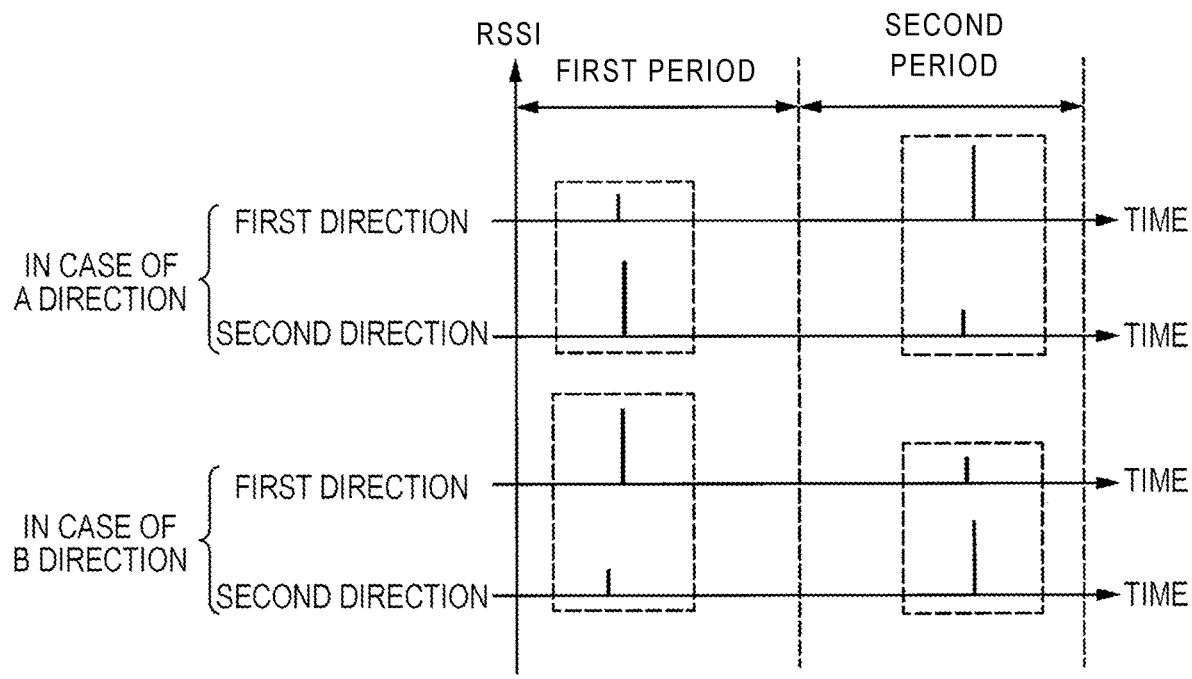

IMAGE PROCESSING DEVICE, METHOD FOR DETERMINING SHEET ORIENTATION, AND SHEET

CROSS-REFERENCE TO RELATED APPLICATION

This application is based upon and claims the benefit of priority from Japanese Patent Application No. 2020-011479, filed on Jan. 28, 2020, the entire contents of which are incorporated herein by reference.

FIELD

Embodiments described herein relate generally to an image processing device, a method for determining an orientation of a sheet, and a sheet.

BACKGROUND

There is an image processing apparatus which can form an image on a sheet that has a Radio Frequency Identifier (RFID) tag incorporated therein or thereon. Such an image processing apparatus includes an RFID reader which may read information from the RFID tag while the sheet is being conveyed for printing.

The orientation of a conveyed sheet may be different from the one specified by the user in advance. In such a case, information may not be properly read from the RFID tag. Therefore, an image processing apparatus has been proposed which has a function to determine the orientation of a conveyed sheet by detecting a position of the RFID tag provided at an end portion of the sheet where printing is not performed.

However, such an image processing apparatus requires an RFID tag be provided at a predetermined position on the sheet, which impairs flexibility in choosing a location of an RFID tag arranged on a sheet.

BRIEF DESCRIPTION OF THE DRAWINGS

FIG. 12C is a diagram illustrating a determination result of a frequency compliance determination process.
FIG. 14A is a diagram illustrating a determination result of an intensity compliance determination process.
FIG. 14B is a diagram illustrating a determination result of an intensity compliance determination process.

DETAILED DESCRIPTION

Figure 1:
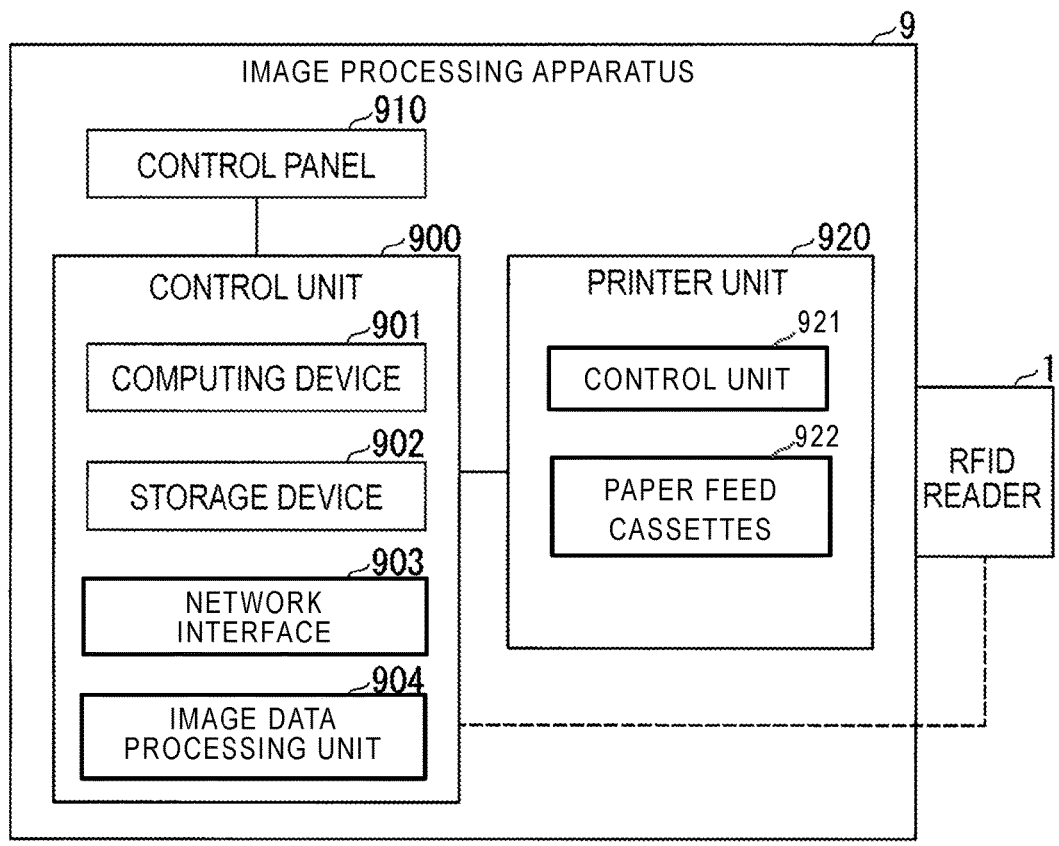
FIG. 1 is a block diagram of an image processing apparatus according to an embodiment.

One or more embodiments provide an RFID reader configured to determine the orientation of a conveyed sheet, in which flexibility in an arrangement of RFID tags on the sheet is improved.

In general, according to one embodiment, an image processing device includes a printing unit configured to print an image on a sheet including first and second wireless tags. The first and second wireless tags have first and second antennas extending along first and second directions. The image processing device further includes a tag reading unit including a third antenna and configured to transmit, towards the sheet from the third antenna, first radio waves polarized in the first direction and second radio waves polarized in the second direction in each of a first period during which the sheet is conveyed towards the third antenna and a second period during which the sheet is conveyed away from the third antenna, and determine an orientation of the sheet based on intensities of third radio waves polarized in the first direction and fourth radio waves polarized in the second direction, which have been received by the third antenna in each of the first and second periods.

Hereinafter, a sheet and an RFID reader according to one or more embodiments will be described with reference to the drawings.

In the following description, configurations having the same or similar functions are designated by the same reference numerals. Furthermore, the description of the duplicated configurations may be omitted.

FIG. 1 is a diagram illustrating an image processing apparatus 9 in an embodiment.

In FIG. 1, the image processing apparatus 9 includes a control unit 900, a control panel 910, a printer unit 920, and an RFID reader 1. The printer unit 920 includes a control unit 921, paper feed cassettes 922, and the like. The control unit 900 controls the control panel 910, the printer unit 920, and the RFID reader 1.

The control unit 900 includes a computing device 901, a storage device 902, a network interface 903, and an image data processing unit 904. The computing device 901 controls the control panel 910, the printer unit 920, and the RFID reader 1 according to an image processing program(s) stored in the storage device 902.

The computing device 901 is a processor such as a Central Processing Unit (CPU) or a circuit such as an Application Specific Integrated Circuit (ASIC). The storage device 902 is a Read Only Memory (ROM), a Random Access Memory (RAM), a Hard Disk Drive (HDD), a Solid State Drive (SSD), or the like. The network interface 903 is a network interface circuit configured to receive print data (for example, data described in a page description language) indicating an image to be printed from a host such as a Personal Computer (PC). The received print data is stored in the storage device 902. The image data processing unit 904 converts data into printable data (for example, raster data) by determining print conditions from print data stored in the storage device 902. The computing device 901 changes the orientation of the image to be printed on a sheet, for example, by performing an orientation determination process. The computing device 901 may execute a process of stopping the printing of the image on the sheet, for example, when the orientation determination result indicates that the orientation is improper.

The control unit 900 controls the conveyance of the sheet in the printer unit 920. The control of sheet conveyance includes the control of the sheet conveyance timing, the sheet stop position, the sheet conveyance speed, and the like.

The control panel 910 includes an input key and a display unit. For example, the input key receives an input from a user. For example, the display unit includes a touch panel. The display unit receives an input from a user and displays information in response to the input. For example, the control panel 910 displays settings related to the operation of the image processing apparatus 9 on the display unit so that the user can change the settings. The control panel 910 notifies the control unit 900 of the settings set by the user.

The printer unit 920 performs an image forming operation. For example, the printer unit 920 forms an image on a sheet based on image data. More specifically, the printer unit 920 forms an image on a sheet based on the data stored in the storage device 902 and processed by the image data processing unit 904.

Figure 3:
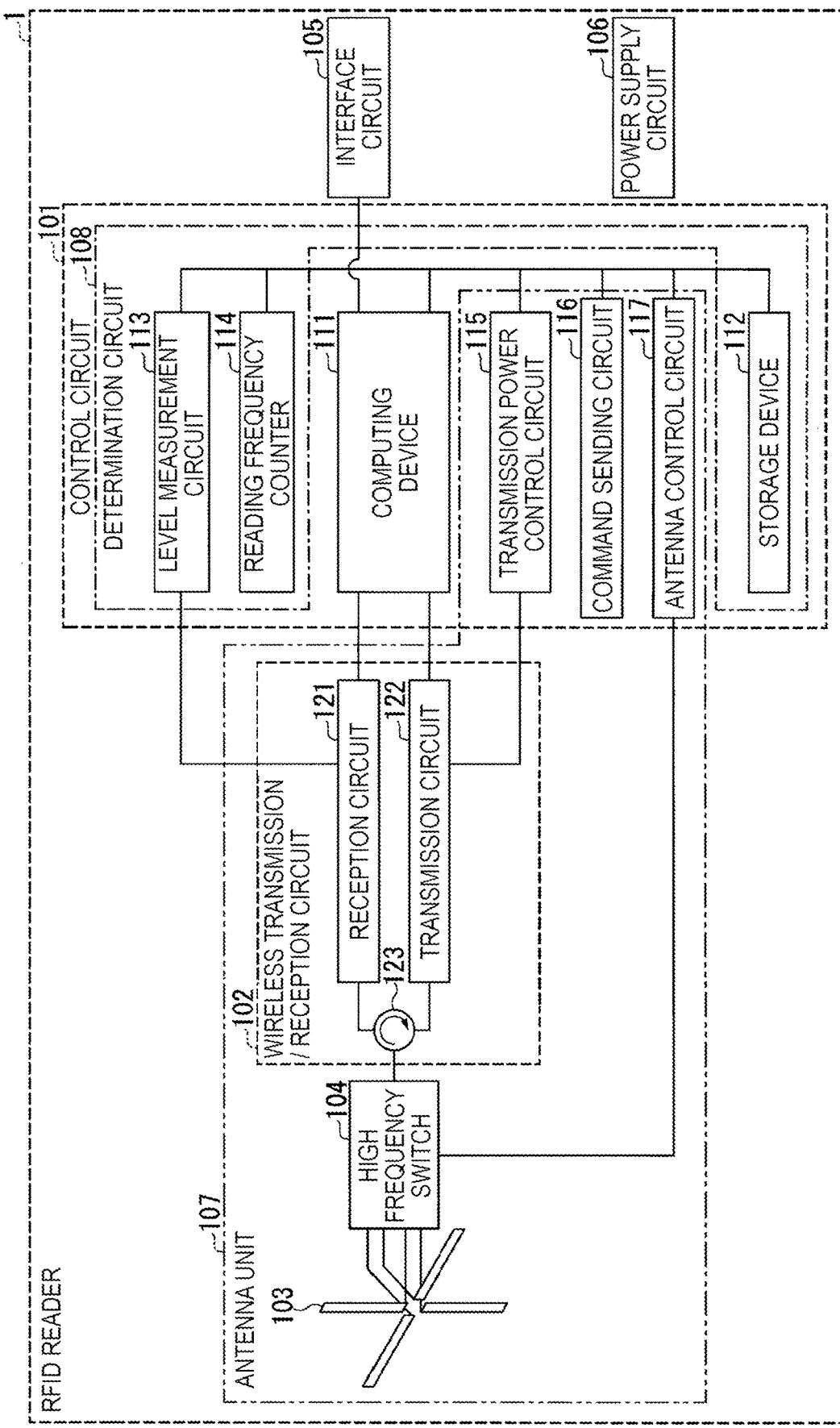
FIG. 3 is a diagram illustrating an RFID reader.

The RFID reader 1 includes a computing device 111 and a storage device 112, as illustrated in FIG. 3. The RFID reader 1 can communicate with the control unit 900. The RFID reader 1 reads information from a RFID tag or writes information to the RFID tag by communicating with the RFID tag on a sheet.

The RFID reader 1 determines the orientation of a sheet before an image is formed on the sheet. The RFID reader 1 determines the orientation of the sheet being conveyed, based on the received power intensity (RSSI; Received Signal Strength Indicator) of the radio wave transmitted from the RFID tag. The RFID reader 1 transmits the determination result (hereinafter referred to as "orientation determination result") to the control unit 900.

The RFID reader 1 receives linearly polarized radio waves having first and second polarization directions (hereinafter simply referred to as "first direction" and "second direction"), which are not parallel. The first direction and the second direction may be any directions as long as they satisfy the non-parallel relationship. The RFID reader 1 stores the RSSI time series (hereinafter referred to as "RSSI time series information") for each direction of the linearly polarized waves. Hereinafter, the radio wave received by the RFID reader 1, which is a linearly polarized wave whose polarization direction is the first direction, is referred to as a first polarized response wave. Hereinafter, a radio wave received by the RFID reader 1, which is a linearly polarized wave whose polarization direction is the second direction, is referred to as a second polarized response wave.

Here, a sheet having an RFID tag used in an embodiment will be described. The sheet includes a sheet body, an RFID tag which transmits the first polarized response wave, and an RFID tag which transmits the second polarized response wave. Each RFID tag on the sheet is a target for reading information by the RFID reader 1. The sheet body is made of materials such as paper and plastic film.

The sheet receives radio waves transmitted by the RFID reader 1. The RFID tag which has received the radio waves returns response radio waves to the RFID reader 1. The RFID reader 1 receives the response radio waves from the RFID tag provided on the sheet. In such a case, the RSSI of the response radio waves from the RFID tag differs depending on the position of the RFID tag, the directivity of the radio waves, and the like. The RFID tag receives the radio waves during conveyance and returns the response radio waves. Therefore, the RSSI of the response radio waves from the RFID tag provided on the sheet changes.

Figure 2:
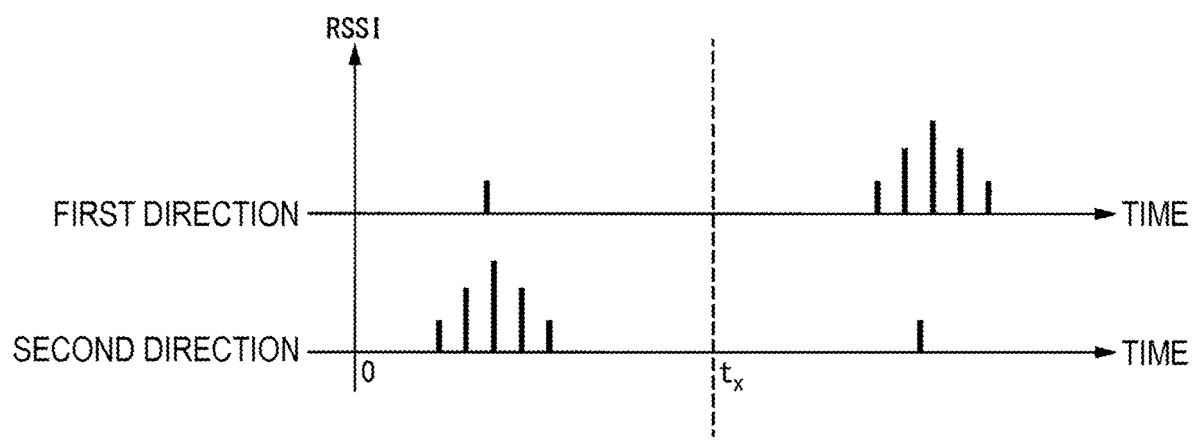
FIG. 2 is a diagram illustrating RSSI time-series information.

FIG. 2 is a diagram illustrating an example of RSSI time series information in the embodiment.

FIG. 2 illustrates a time series of RSSI of response radio waves in the first direction and the second direction. FIG. 2 illustrates that the number of detected RSSIs in the first direction is greater in the period after a time $t_x$ than in the period before the time $t_x$. FIG. 2 illustrates that the number of detected RSSIs in the second direction is smaller in the period after the time $t_x$ than in the period before the time $t_x$.

FIG. 3 is a diagram illustrating the RFID reader 1 according to an embodiment.

The RFID reader 1 includes a control circuit 101, a wireless transmission/reception circuit 102, an antenna 103, a high frequency switch 104, an interface circuit 105, and a power supply circuit 106.

The control circuit 101 includes the computing device 111, the storage device 112, and the like, and controls the operation of the RFID reader 1. More specifically, the control circuit 101 includes the computing device 111, the storage device 112, a level measurement circuit 113, a reading frequency counter 114, a transmission power control circuit 115, a command sending circuit 116, and an antenna control circuit 117. The computing device 111 reads a program(s) stored in the storage device 112 and executes the read program(s).

The control circuit 101 executes, for example, a process of measuring the magnitude of RSSI of response waves from an RFID tag on a sheet. The control circuit 101 acquires RSSI time series information by executing the process of measuring the magnitude of the RSSI. The control circuit 101 executes, for example, a process of determining the orientation of the sheet based on the RSSI time series information.

The process of determining the orientation of the sheet based on the RSSI time series information is, for example, a frequency compliance determination process. The frequency compliance determination process is a process of executing a frequency acquisition process and determining the orientation of the sheet based on the result of the frequency acquisition process. The frequency acquisition process is a process of acquiring the number of times that the RSSI that is equal to or greater than a predetermined threshold value for each predetermined period is measured.

Figure 4:
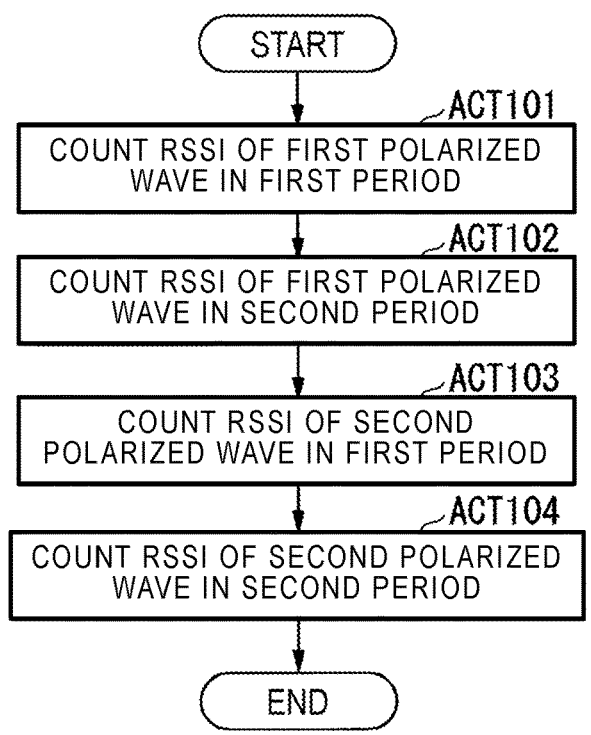
FIG. 4 is a flowchart of a frequency acquisition process.

FIG. 4 is a flowchart of the frequency acquisition process in an embodiment.

The control circuit 101 counts the number of pieces of data having high intensity RSSI of first polarized response waves among the data of RSSI time series in a first period (ACT 101). The first period is a period from the time of the origin of the RSSI time series to a predetermined time that is set in advance (hereinafter referred to as "change time"). The high intensity RSSI is an RSSI which is equal to or greater than a predetermined threshold value that is set in advance. The RSSI below the predetermined threshold value indicates that the signal is weak due to noise. Therefore, the number of pieces of high intensity RSSI data is the number of times effective radio waves are received. The change time is, for example, the $t_x$ in FIG. 2. Any time period may be employed as the change time. For example, the change time is a predetermined time according to the sheet conveyance speed and the RFID arrangement.

Next, the control circuit 101 counts the number of pieces of data having high intensity RSSI of first polarized response waves among the data of RSSI time series in a second period (ACT 102). The second period is a period following the first period. The end of the second period corresponds to the end of the RSSI time series.

Next, the control circuit 101 counts the number of pieces of data having high intensity RSSI of second polarized response waves among the data of RSSI time series in the first period (ACT 103). Next to ACT 103, in the frequency acquisition process, the number of pieces of data having high intensity RSSI of the second polarized response waves among the data of RSSI time series in the second period is counted (ACT 104).

The frequency acquisition process is specifically executed by the level measurement circuit 113 and the reading frequency counter 114, which will be described in detail below. The processes of ACT 101 to ACT 104 may be executed in any order.

Referring back to the description of FIG. 3, the computing device 111 is, for example, a CPU, an ASIC, or the like. The storage device 112 is a ROM, a RAM, an HDD, an SSD or the like. The storage device 112 stores, for example, RSSI time series information.

The level measurement circuit 113 measures the magnitude of RSSI. The time series of the measurement result by the level measurement circuit 113 is the RSSI time series information. That is, the level measurement circuit 113 acquires the RSSI time series information based on RSSI.

The reading frequency counter 114 counts the number of high intensity RSSIs of the first polarized response waves in the first and second periods based on the measurement result of the level measurement circuit 113. The reading frequency counter 114 counts the number of high intensity RSSIs of the second polarized response waves in the first and second periods based on the measurement result of the level measurement circuit 113.

The transmission power control circuit 115 controls the intensity of the radio wave (that is, the radio wave transmitted from the antenna 103 described below) transmitted by the RFID reader 1. More specifically, based on information (hereinafter referred to as "sheet type information") indicating the type of sheet being conveyed, the intensity of the radio wave transmitted by the RFID reader 1 is controlled to be a predetermined value. The sheet type information is input by the user via the control panel 910, for example. The transmission power control circuit 115 may control the intensity of the radio wave transmitted by the RFID reader 1 to a predetermined intensity when the sheet type information is not input.

The command sending circuit 116 determines information (hereinafter referred to as "transmission information") to be transmitted to an RFID tag. The information sent by the command sending circuit 116 is, for example, information which instructs the RFID tag to send a predetermined radio wave.

The antenna control circuit 117 controls the operation of the high frequency switch 104. The antenna control circuit 117 controls the operation of the antenna 103 via the control of the high frequency switch 104. The antenna control circuit 117 controls the operation of the high frequency switch 104 such that the radio wave transmitted by the antenna 103 carries the transmission information, for example. To control the operation of the high frequency switch 104 so as to carry the transmission information specifically means that the high frequency switch 104 modulates the radio wave transmitted by the antenna 103 so that the radio wave transmitted by the antenna 103 carries transmission information.

The antenna control circuit 117 controls the polarization direction of the radio wave transmitted by the antenna 103 by controlling the operation of the high frequency switch 104, for example.

The wireless transmission/reception circuit 102 includes a reception circuit 121, a transmission circuit 122, and a shared circuit 123. The reception circuit 121 is a circuit in which a current indicating the intensity of the radio wave received by the antenna 103 flows toward the control circuit 101. The transmission circuit 122 allows a current to flow from the control circuit 101 to the antenna 103. The shared circuit 123 controls the connection between the antenna 103 and the reception circuit 121 and the transmission circuit 122. For example, the shared circuit 123 is a circulator.

The antenna 103 transmits a radio wave. The antenna 103 is capable of transmitting a linearly polarized wave in the first direction (hereinafter called "first linearly polarized wave") and a linearly polarized wave in the second direction (hereinafter called "second linearly polarized wave") that is not parallel to the first direction. The antenna 103 is, for example, two dipole antennas arranged non-parallel to each other. The two non-parallel arranged dipole antennas are, for example, two orthogonal dipole antennas.

The antenna 103 does not transmit the first linearly polarized wave and the second linearly polarized wave at the same time.

The polarization direction of the radio wave transmitted by the antenna 103 is controlled by the antenna control circuit 117 controlling the operation of the high frequency switch 104. The high frequency switch 104 controls the polarization direction of the radio wave transmitted by the antenna 103 by controlling the position on the antenna 103 where a voltage is applied under the control of the antenna control circuit 117. The antenna 103 to which the voltage is applied so that the plane of polarization is formed in the first direction transmits a radio wave whose polarization direction is the first direction (i.e., the first linearly polarized wave). The antenna 103 to which the voltage is applied so that the plane of polarization is formed in the second direction transmits a radio wave whose polarization direction is the second direction. Hereinafter, the first linearly polarized wave transmitted by the antenna 103 is also referred to as the "first polarized interrogation wave." Hereinafter, the second linearly polarized wave transmitted by the antenna 103 is also referred to as the "second polarized interrogation wave."

The high frequency switch 104 controls the position where the voltage is applied on the antenna 103 by the control of the antenna control circuit 117.

A method in which the high frequency switch 104 controls the position where the voltage is applied on the antenna 103 will be described.

For example, the high frequency switch 104 connects the transmission circuit 122 and the antenna 103, and controls the connection point of the transmission circuit 122 on the antenna 103. When the number of polarization directions of the linearly polarized waves transmitted by the antenna 103 is set as N (N is an integer of two or more), there are two sets of connection points (2×N) in total. Hereinafter, each set of connection points will be referred to as a connection set. N is specifically two. In such a case, the number of connection sets is two and the number of connection points is four.

The high frequency switch 104, under the control of the antenna control circuit 117, alternately switches the connection set at a predetermined cycle, for example. The high frequency switch 104 switches the connection set at a predetermined cycle, so that the antenna 103 alternately transmits the first polarized interrogation wave and the second polarized interrogation wave at the predetermined cycle.

The predetermined period is longer than a response time. The response time is a time period between the time when the antenna 103 transmits the radio wave and the time when the radio wave (hereafter referred to as "response radio wave".) transmitted by the RFID tag and indicating that the RFID tag has received the radio wave is received by the antenna 103. Among the response radio waves, the response radio wave whose polarization direction is the first direction is the first polarized response wave. Among the response radio waves, the response radio wave whose polarization direction is the second direction is the second polarized response wave.

The high frequency switch 104 modulates the radio wave transmitted by the antenna 103 under the control of the antenna control circuit 117. The high frequency switch 104, under the control of the antenna control circuit 117, modulates the radio wave transmitted by the antenna 103 so that the radio wave transmitted by the antenna 103 carries the transmission information.

The interface circuit 105 is an interface which electrically connects the control circuit 101 and the control unit 900. The power supply circuit 106 supplies power to the RFID reader 1.

The transmission power control circuit 115, the command sending circuit 116, the antenna control circuit 117, the wireless transmission/reception circuit 102, the antenna 103, and the high frequency switch 104 make up an antenna unit 107 disposed on one circuit board. The antenna unit 107 controls the operation of the antenna 103 and transmits or receives a radio wave via the antenna 103.

The level measurement circuit 113, the reading frequency counter 114, the computing device 111, and the storage device 112 make up a determination circuit 108. The determination circuit 108 controls the operation of the antenna unit 107. The determination circuit 108 determines the orientation of a conveyed sheet.

Figure 5:
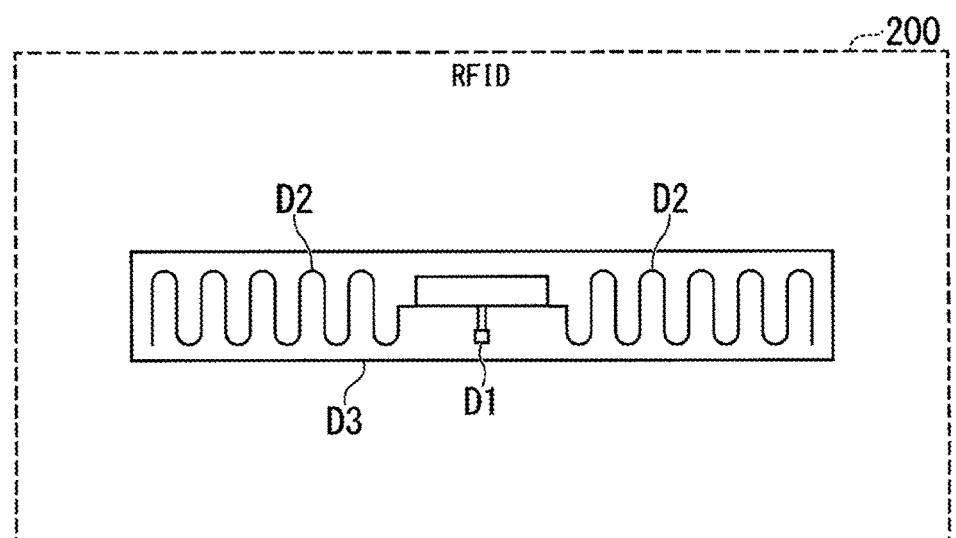
FIG. 5 is a diagram illustrating an RFID tag on a sheet.

FIG. 5 is a diagram illustrating an RFID tag 200 arranged on a sheet in an embodiment.

The RFID 200 includes an Integrated Circuit (IC) chip D1 and a dipole antenna D2. The antenna D2 is located symmetrically with respect to the chip D1. The antenna D2 has a meandering shape. The IC chip D1 and the antenna D2 are attached on a film substrate D3. In the RFID tag 200, the polarization direction with the highest reception efficiency and the polarization direction of the radio wave to be transmitted are the same. The reception efficiency is the efficiency of receiving radio waves. The high reception efficiency of the antenna means that the efficiency of converting the radio wave arriving at the antenna into high frequency power is high.

Therefore, for example, the RFID tag 200 parallel to the first direction has the highest reception efficiency of the radio wave in the first direction, and transmits the first polarized response wave. Further, for example, the RFID tag 200 parallel to the second direction has the highest reception efficiency of radio waves in the second direction, and transmits the second polarized response wave. Hereinafter, the RFID tag in which the reception efficiency of the radio wave in the first direction is the highest and transmitting the first polarized response wave is referred to as a "first RFID tag." Hereinafter, the RFID tag in which the reception efficiency of the radio wave in the second direction is the highest and transmits the second polarized response wave is referred to as a "second RFID tag." Both the first RFID tag and the second RFID tag are the RFID tags 200 and the difference is its orientation on the sheet.

Figure 6:
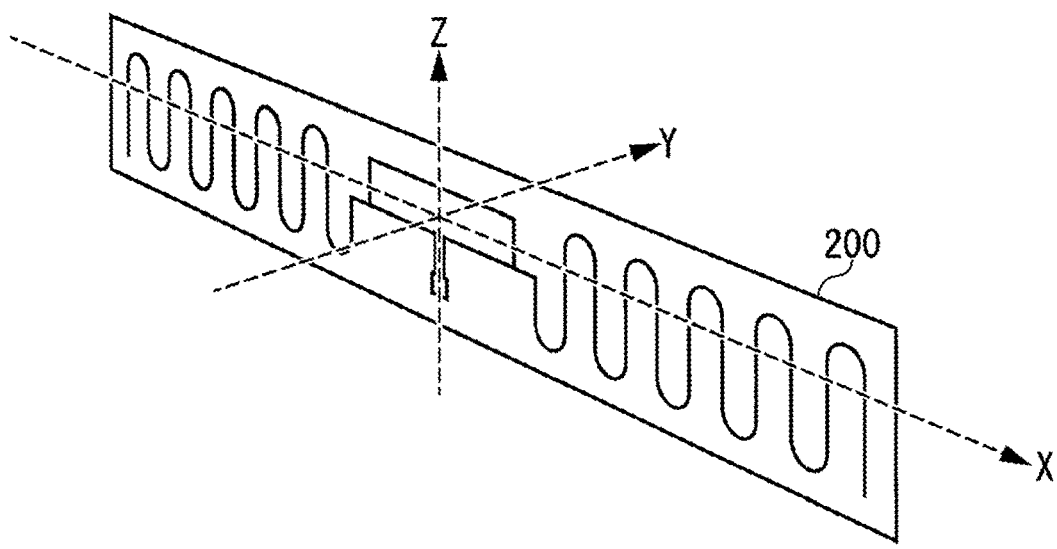
FIG. 6 is a diagram illustrating aspects related to a plane of polarization.

FIG. 6 is a diagram illustrating the plane of polarization in an embodiment.

In FIG. 6, the Z direction indicates the sheet conveyance direction viewed from the RFID reader 1 and in which the printer unit 920 conveys the sheet. The direction viewed from the RFID reader 1 is a propagation direction of the radio wave transmitted by the RFID reader 1. In FIG. 6, the propagation direction of the radio wave is the Y direction. One of the polarization planes is a plane parallel to the XY plane. Another of the polarization planes is a plane parallel to the YZ plane.

Figure 7:
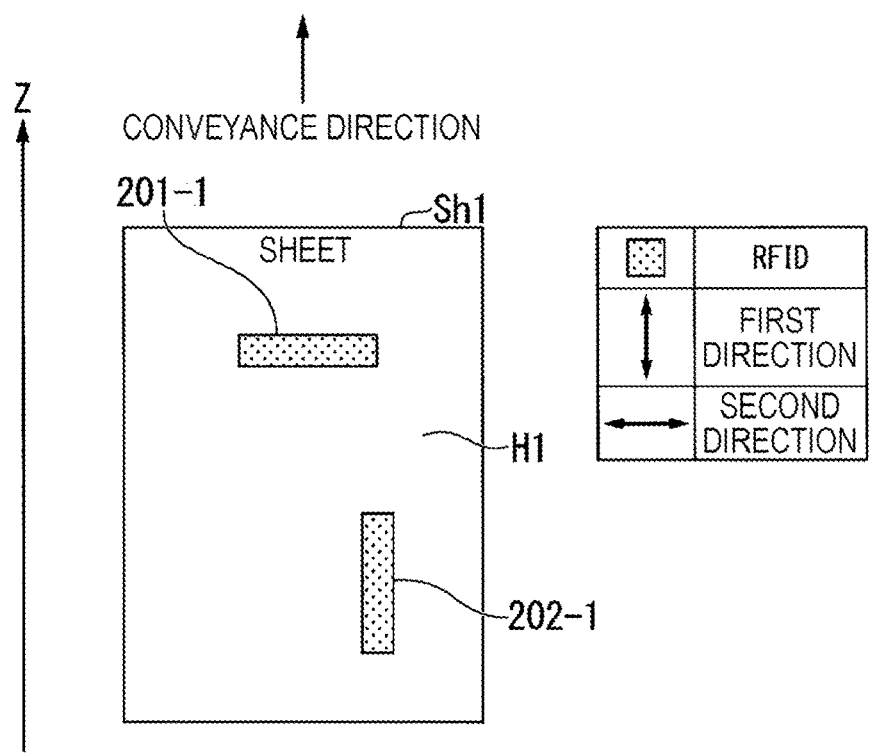
FIG. 7 is a diagram illustrating an arrangement of RFID tags on a sheet.

FIG. 7 is a diagram illustrating an arrangement of RFID tags on a sheet in an embodiment.

In FIG. 7, a sheet Sh1 includes a sheet body H1, a first RFID tag 201-1 and a second RFID tag 202-1. More specifically, the first RFID tag 201-1 and the second RFID 202-1 tag are attached on the surface of the sheet body H1. An image is formed on the sheet body H1.

The conveyance direction of the sheet Sh1 illustrated in FIG. 7 is, for example, the +Z direction. The conveyance direction of the sheet Sh1 may be the −Z direction.

Figure 8:
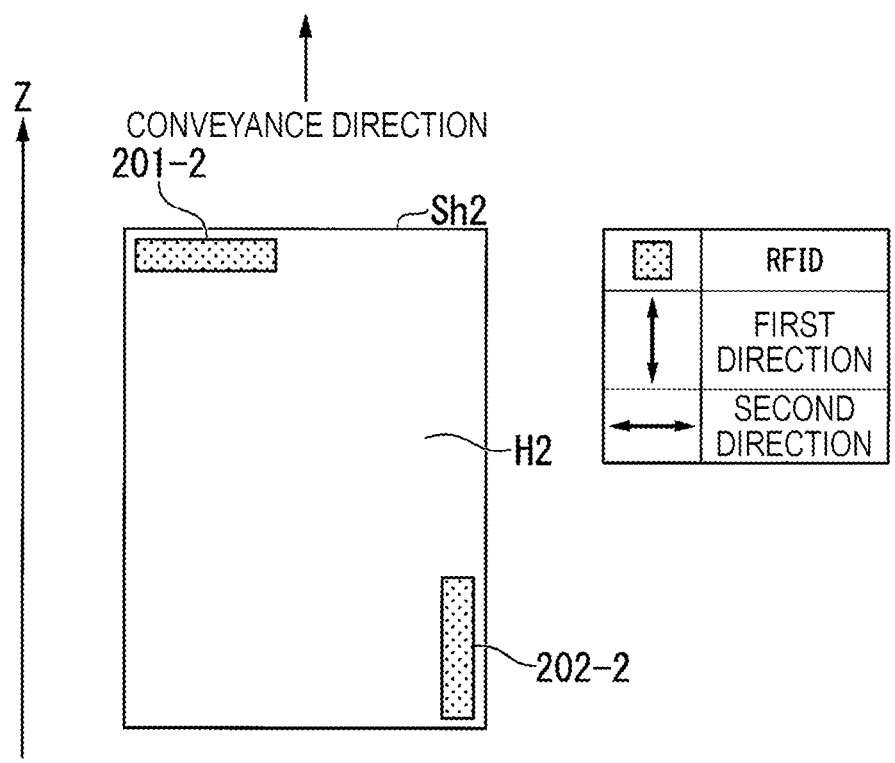
FIG. 8 is a diagram illustrating an arrangement of RFID tags on a sheet.

FIG. 8 is a diagram illustrating another arrangement of RFID tags on a sheet in an embodiment.

In FIG. 8, a sheet Sh2 includes a sheet body H2, a first RFID tag 201-2, and a second RFID tag 202-2. More specifically, the first RFID tag 201-2 and the second RFID tag 202-2 are attached on the surface of the sheet body H2. An image is formed on the sheet body H2.

The conveyance direction of the sheet Sh2 illustrated in FIG. 8 is, for example, the +Z direction. The conveyance direction of the sheet Sh2 may be the −Z direction.

Figure 9:
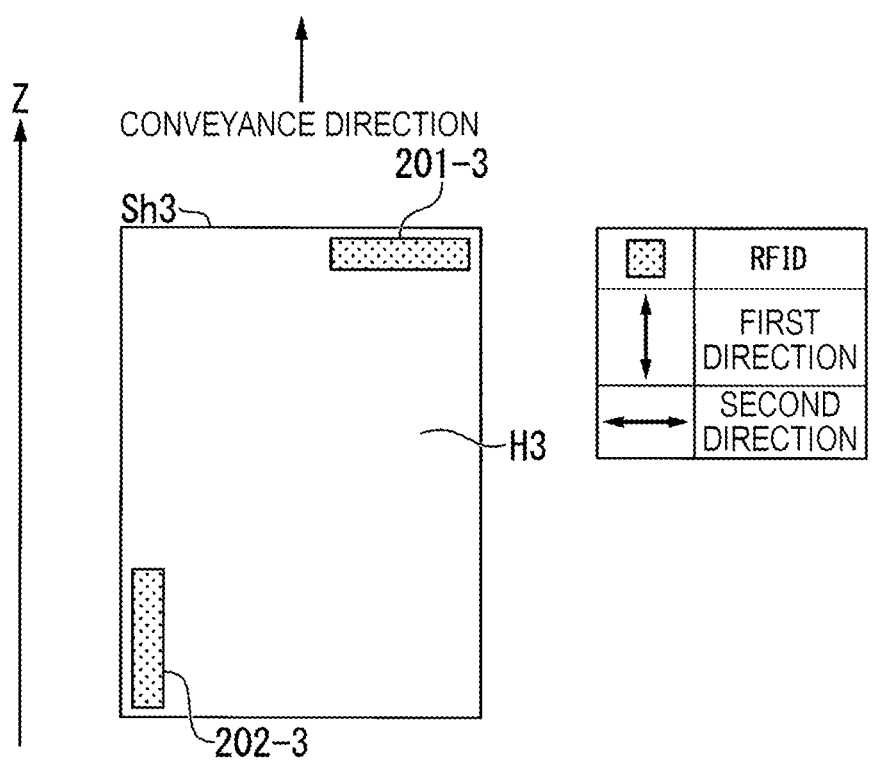
FIG. 9 is a diagram illustrating an arrangement of RFID tags on a sheet.

FIG. 9 is a diagram illustrating another arrangement of RFID tags on a sheet in an embodiment.

In FIG. 9, a sheet Sh3 includes a sheet body H3, a first RFID tag 201-3, and a second RFID tag 202-3. More specifically, the first RFID tag 201-3 and the second RFID tag 202-3 are attached on the surface of the sheet body H3. An image is formed on the sheet body H3.

The conveyance direction of the sheet Sh3 illustrated in FIG. 9 is, for example, the +Z direction. The conveyance direction of the sheet Sh3 may be the −Z direction.

Figure 10:
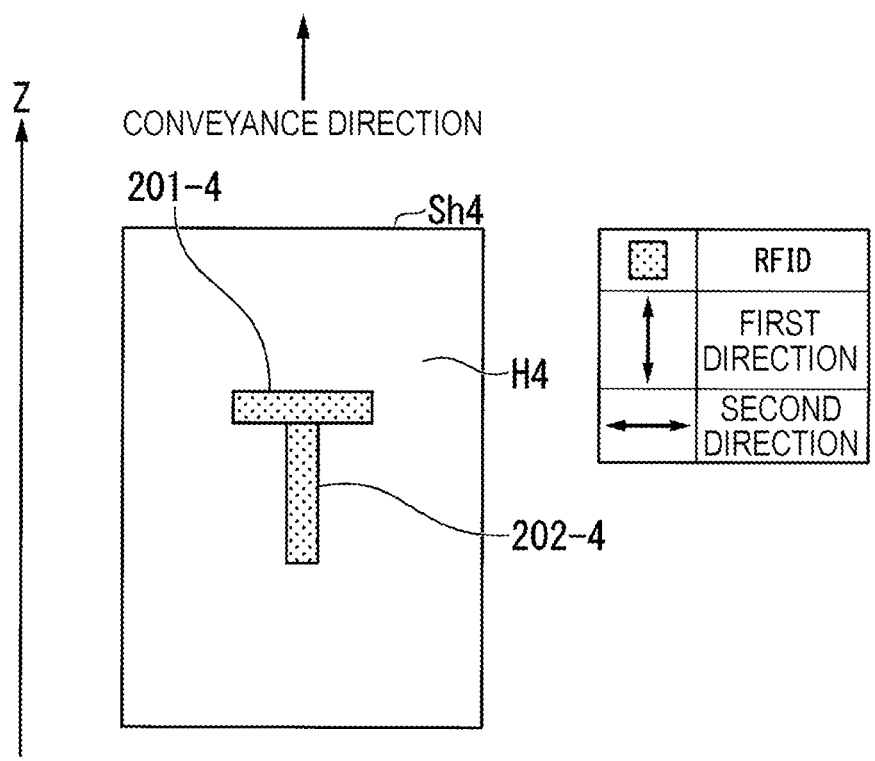
FIG. 10 is a diagram illustrating an arrangement of RFID tags on a sheet.

FIG. 10 is a diagram illustrating another arrangement of RFID tags on a sheet in an embodiment.

In FIG. 10, a sheet Sh4 includes a sheet body H4, a first RFID tag 201-4, and a second RFID tag 202-4. More specifically, the first RFID tag 201-4 and the second RFID tag 202-4 are attached on the surface of the sheet body H4. An image is formed on the sheet body H4.

The conveyance direction of the sheet Sh4 illustrated in FIG. 10 is, for example, the +Z direction. The conveyance direction of the sheet Sh4 may be the −Z direction.

Figure 11:
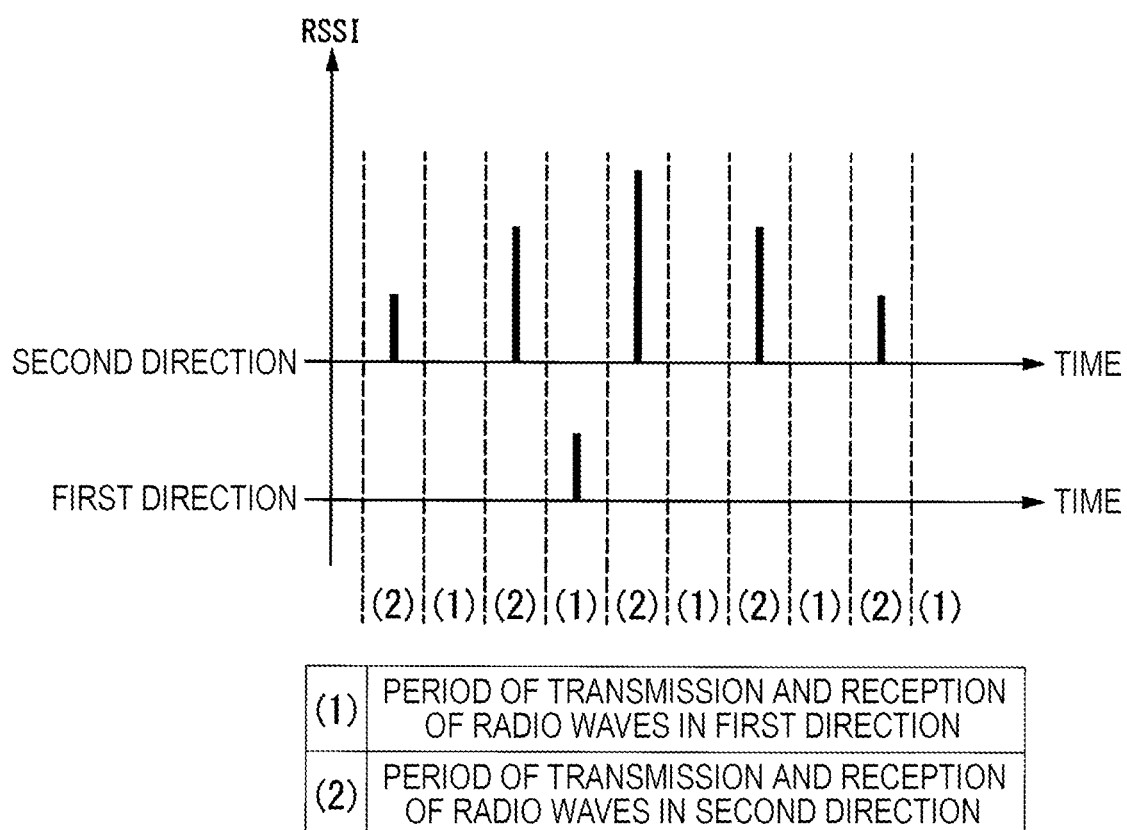
FIG. 11 is a diagram illustrating RSSI time series in each polarization direction.

FIG. 11 is a diagram illustrating a time series of RSSI in each polarization direction in an embodiment.

FIG. 11 illustrates a time series of RSSI in the first direction and a time series of RSSI in the second direction when the sheet illustrated in FIG. 7 is conveyed in the +Z direction. In the time period shown in FIG. 11, the RFID tag 201-1 parallel to the second direction is more likely to receive radio waves than the RFID tag 202-1 parallel to the first direction.

As described above, the RFID tag 201-1 parallel to the second direction has the highest reception efficiency of the radio wave in the second direction, and transmits the second polarized response wave. Therefore, in the period in which the RFID tag 201-1 parallel to the second direction is more likely to receive the radio wave than the RFID tag 202-1 parallel to the first direction, the antenna 103 receives the radio wave from the RFID tag 201-1 at a higher frequency than the RFID tag 202-1.

FIG. 11 illustrates that a period in which the RFID reader 1 receives radio waves polarized in the first direction and a period in which the RFID reader 1 receives radio waves polarized in the second direction exist. During the period when the RFID reader 1 receives the radio wave polarized in the first direction, the RFID reader 1 transmits the first polarized interrogation wave and receives the first polarized response wave. During the period when the RFID reader 1 receives the radio wave polarized in the second direction, the RFID reader 1 transmits the second polarized interrogation wave and receives the second polarized response wave. The period in which the RFID reader 1 receives the radio wave polarized in the first direction and the period in which the RFID reader 1 receives the radio wave polarized in the second direction are alternately repeated. The operation of the RFID reader 1 in which the period during which the RFID reader 1 receives the radio wave polarized in the first direction and the period during which the RFID reader 1 receives the radio wave polarized in the second direction are alternately repeated is controlled by the computing device 111.

Figure 12A:
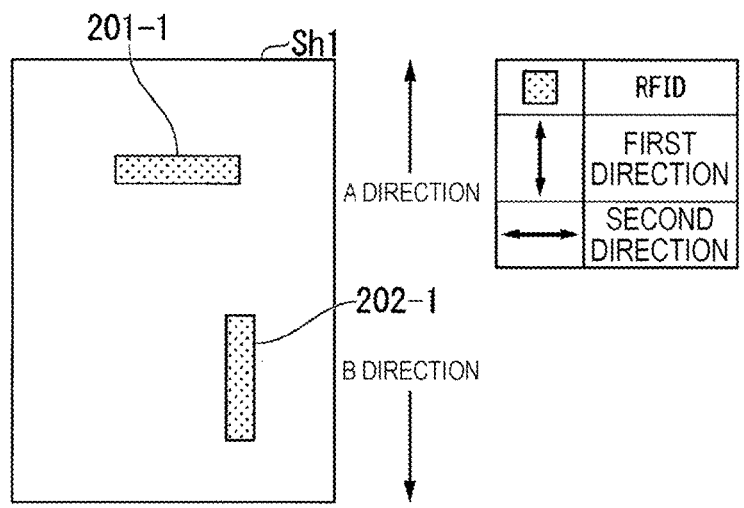
FIG. 12A is a diagram illustrating a determination result of a frequency compliance determination process.
Figure 12B:
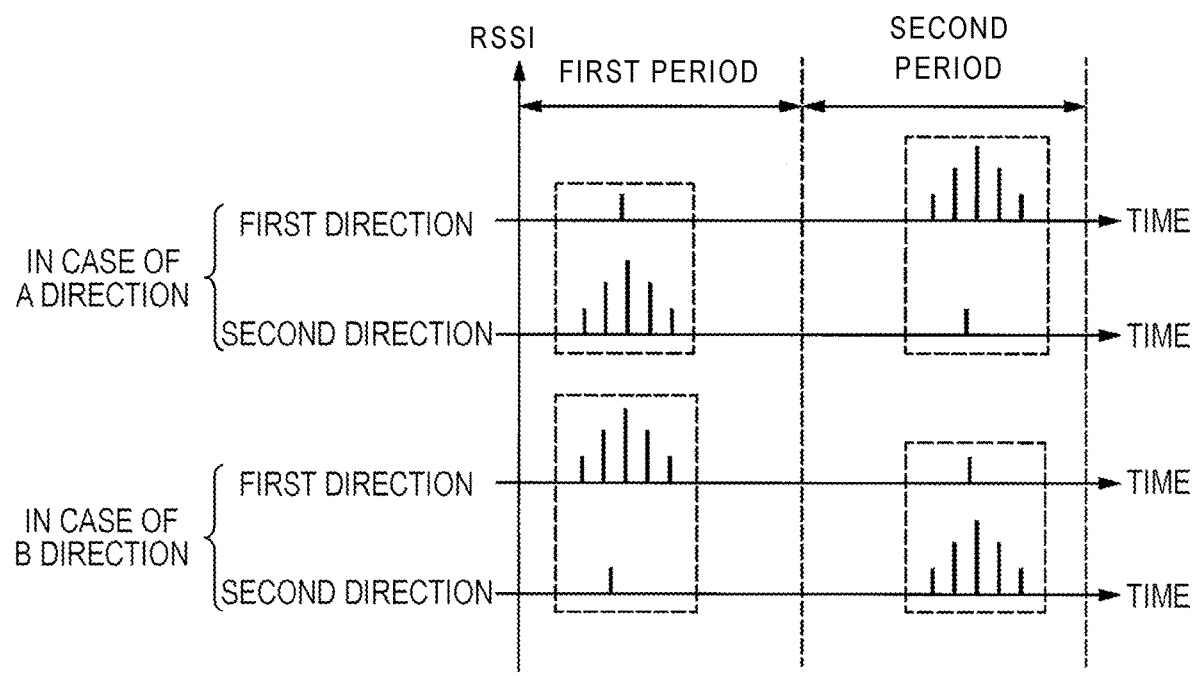
FIG. 12B is a diagram illustrating a determination result of a frequency compliance determination process.

FIGS. 12A to 12C are diagrams illustrating a determination result of the frequency compliance determination process in an embodiment.

FIG. 12A is a diagram illustrating the orientation of the sheet. The B direction in FIG. 12A is the direction opposite to the A direction. When the conveyance direction of the sheet is the A direction (hereinafter, "the orientation of the sheet is the A direction"), the second RFID tag (i.e., the RFID tag arranged parallel to the first direction) is located on the front side of the first RFID tag in the conveyance direction. When the conveyance direction of the sheet is the B direction (hereinafter, "the orientation of the sheet is the B direction"), the first RFID tag (i.e., the RFID tag arranged parallel to the second direction) is located on the front side of the second RFID tag in the conveyance direction. The sheet illustrated in FIG. 12A is the same sheet Sh1 as the sheet illustrated in FIG. 7.

FIG. 12B illustrates a time series result of high intensity RSSI in each polarization direction in the case where the orientation of the sheet is the A direction and a time series result of high intensity RSSI in each polarization direction when the orientation of the sheet is the B direction.

In the first period in FIG. 12B, the sheet is conveyed so as to approach the antenna 103. In the second period in FIG. 12B, the sheet is conveyed away from the antenna 103.

When the orientation of the sheet is the A direction, the second RFID tag is located on the front side of the first RFID tag in the conveyance direction, so the number of high intensity RSSIs in the second direction is larger than the number of high intensity RSSIs in the first direction in the first period.

When the orientation of the sheet is the A direction, the second RFID tag is located on the front side of the first RFID tag in the conveyance direction, so the number of high intensity RSSIs in the first direction is larger than the number of high intensity RSSIs in the second direction in the second period.

When the orientation of the sheet is the B direction, the first RFID tag is located on the front side of the second RFID tag in the conveyance direction, so the number of high intensity RSSIs in the first direction is larger than the number of high intensity RSSIs in the second direction in the first period.

When the orientation of the sheet is the B direction, the first RFID tag is located on the front side of the second RFID tag in the conveyance direction, so the number of high intensity RSSIs in the second direction is larger than the number of high intensity RSSIs in the first direction in the second period.

FIG. 12C is a diagram illustrating a determination result of whether the sheet in FIG. 12A is conveyed in the A direction or the B direction.

In FIG. 12C, "F1" indicates the number of high intensity RSSIs in the first direction in the first period. In FIG. 12C, "B1" indicates the number of high intensity RSSIs in the first direction in the second period. In FIG. 12C, "F2" indicates the number of high intensity RSSIs in the second direction in the first period. In FIG. 12C, "B2" indicates the number of high intensity RSSIs in the second direction in the second period.

FIG. 12C illustrates that the sheet conveyance direction is determined to be the A direction by the frequency compliance determination process when the following first determination condition and second determination condition are satisfied. The first determination condition is a condition that the number of high intensity RSSIs in the first direction in the first period is less than the number of high intensity RSSIs in the first direction in the second period. The second determination condition is a condition that the number of high intensity RSSIs in the second direction in the first period is larger than the number of high intensity RSSIs in the second direction in the second period. Therefore, when the first determination condition and the second determination condition are satisfied, the sheet conveyance direction is the A direction. The fact that the sheet conveyance direction is the A direction means that it is oriented such that the second RFID tag is positioned on the front side of the first RFID tag in the conveyance direction.

FIG. 12C illustrates that the sheet conveyance direction is determined to be the B direction by the frequency compliance determination process when the following third determination condition and fourth determination condition are satisfied. The third determination condition is a condition that the number of high intensity RSSIs in the first direction in the first period is greater than the number of high intensity RSSIs in the first direction in the second period. The fourth determination condition is a condition that the number of high intensity RSSIs in the second direction in the first period is less than the number of high intensity RSSIs in the second direction in the second period. Therefore, when the third determination condition and the fourth determination condition are satisfied, the sheet conveyance direction is the B direction. The fact that the sheet conveyance direction is the B direction means that it is oriented such that the first RFID tag is positioned on the front side of the second RFID tag in the conveyance direction.

Figure 13:
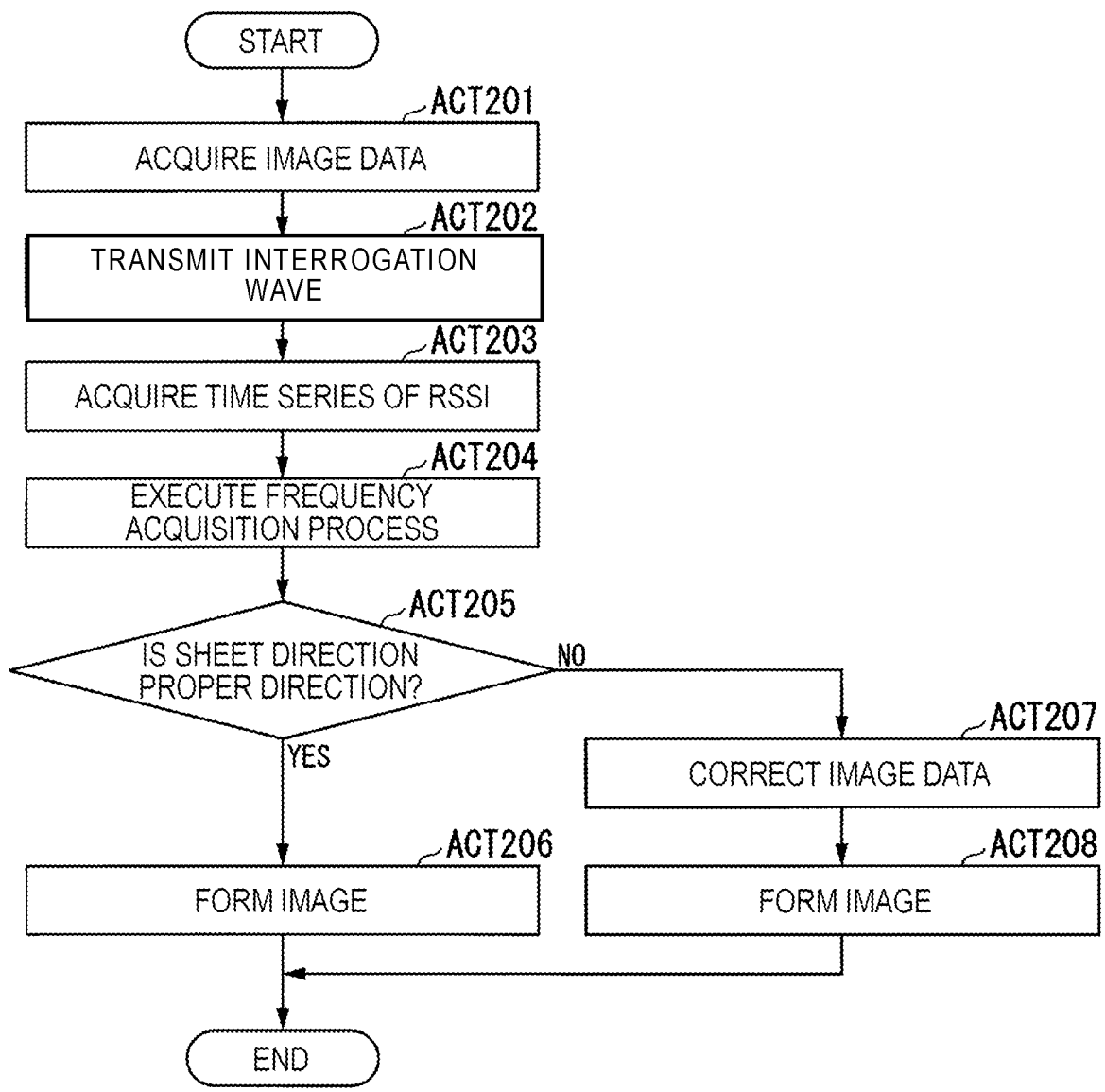
FIG. 13 is a flowchart of a process executed by an RFID reader.

FIG. 13 is a flowchart of a process executed by the RFID reader 1 according to an embodiment. Specifically, FIG. 13 shows the flow of the process executed by the RFID reader 1 in the case of determining whether the sheet conveyance direction in FIG. 12 is the A direction or the B direction. In FIG. 13, it is assumed that the orientation of the sheet is appropriate when the sheet is conveyed in the A direction. Hereinafter, the A direction will be referred to as the proper direction.

The control unit 900 acquires image data to be printed on a sheet (ACT 201). Next, the antenna 103 transmits the polarized interrogation wave under the control of the antenna control circuit 117 towards the sheet (ACT 202). The polarized interrogation wave is the first polarized interrogation wave or the second polarized interrogation wave. Next, the control circuit 101 acquires the time series of the received power intensity (i.e., RSSI) of the response radio waves from the first RFID tag and the second RFID tag (ACT 203). Next, the control circuit 101 executes the frequency acquisition process based on the acquired time series of the RSSI (ACT 204). After ACT 204, the control circuit 101 determines the direction of the sheet based on the result acquired in the frequency acquisition process (ACT 205). Determining the sheet direction is specifically determining the orientation of the sheet with respect to the conveyance direction.

When the direction of the sheet is the proper direction (ACT 205: YES), the printer unit 920 forms the image indicated by the image data on the sheet (ACT 206). On the other hand, when the direction of the sheet is not the proper direction (ACT 205: NO), the control unit 900 corrects the image data according to the sheet direction (ACT 207). Here, the direction that is not the proper direction is the B direction. Correcting the image data according to the direction of the sheet means, for example, reversing the direction of the image data. After ACT 207, the printer unit 920 forms the image indicated by the corrected image data on the sheet using the corrected image data (ACT 208).

The RFID reader 1 in the aforementioned embodiments determines the orientation of the sheet based on the intensity of the radio waves transmitted by the RFID tags in each polarization direction. The level measurement circuit 113, the reading frequency counter 114, the computing device 111, and the storage device 112 do not detect the position of the RFID tag on the sheet, but determine the orientation of the sheet based on the intensity of the response radio waves in each polarization direction. Therefore, the RFID tag does not necessarily have to be provided at the edge of the sheet. Since the RFID tag does not need to be provided at the edge of the sheet, the flexibility is improved in choosing a location where the RFID tag is attached on the sheet.

Modification Example

The RFID reader 1 does not necessarily need to receive a plurality of response radio waves in both the first period and the second period. The RFID reader 1 may receive the response radio wave at least once for each polarization direction in each period. For example, the RFID reader 1 may receive the response radio wave once for each polarization direction in each period. In such a case, the control circuit 101 executes an intensity compliance determination process instead of the frequency compliance determination process. The intensity compliance determination process is a process of determining the direction of the sheet based on the difference in received first polarized response wave intensity between the first period and the second period and the difference in received second polarized response wave intensity between the first period and the second period.

FIGS. 14A and 14B are diagrams illustrating a determination result of the intensity compliance determination process.

The sheet used for the description of FIGS. 14A and 14B is the same sheet as the sheet illustrated in FIG. 12A.

FIG. 14A illustrates a time series result of RSSI of response radio waves in each polarization direction where the orientation of the sheet is the A direction and a time series result of RSSI of response radio waves in each polarization direction when the orientation of the sheet is the B direction.

The first period in FIG. 14A is a period in which the sheet is conveyed so as to approach the antenna 103. The second period in FIG. 14 is a period in which the sheet is conveyed away from the antenna 103.

When the orientation of the sheet is the A direction, the second RFID tag is located on the front side of the first RFID tag in the conveyance direction. Therefore, in the first period, the strength of RSSI of the response radio wave in the second direction is stronger than that in the first direction. This is because, in the first period, the second RFID tag is closer to the RFID reader 1 than the first RFID tag, so that the response radio wave from the second RFID tag has a stronger intensity than that from the first RFID tag.

When the orientation of the sheet is the A direction, the second RFID tag is located on the front side of the first RFID tag in the conveyance direction. Therefore, in the second period, the intensity of RSSI of the response wave in the first direction is stronger than that in the second direction. This is because, in the second period, the first RFID tag is closer to the RFID reader 1 than the second RFID tag, so that the response radio wave from the first RFID tag has a stronger intensity than that from the second RFID tag.

When the orientation of the sheet is the B direction, the first RFID tag is located on the front side of the second RFID tag in the conveyance direction. Therefore, in the first period, the intensity of RSSI of the response radio wave in the first direction is stronger than that in the second direction. This is because, in the first period, the first RFID tag is closer to the RFID reader 1 than the second RFID tag, so that the response radio wave from the first RFID tag has a stronger intensity than that from the second RFID tag.

When the orientation of the sheet is the B direction, the first RFID tag is located on the front side of the second RFID tag in the conveyance direction. Therefore, in the second period, the intensity of RSSI of the response radio wave in the second direction is stronger than that in the first direction. This is because, in the second period, the second RFID tag is closer to the RFID reader 1 than the first RFID tag, so that the response radio wave from the second RFID tag has a stronger intensity than that from the first RFID tag.

FIG. 14B is a diagram illustrating a determination result by the intensity compliance determination process. In FIG. 14B, "$E_{F1}$" indicates the intensity of RSSI of the response radio wave in the first direction in the first period. In FIG. 14B, "$E_{B1}$" indicates the intensity of RSSI of the response radio wave in the first direction in the second period. In FIG. 14B, "$E_{F2}$" indicates the intensity of RSSI of the response radio wave in the second direction in the first period. In FIG. 14B, "$E_{B2}$" indicates the intensity of RSSI of the response radio wave in the second direction in the second period.

FIG. 14B shows that the sheet conveyance direction is determined to be the A direction by the intensity compliance determination process when the following fifth determination condition and sixth determination condition are satisfied. The fifth determination condition is that the intensity of RSSI of the response radio wave in the first direction in the first period is weaker than the intensity of RSSI of the response radio wave in the first direction in the second period. The sixth determination condition is that the intensity of RSSI of the response radio wave in the second direction in the first period is stronger than the intensity of RSSI in the second direction in the second period.

FIG. 14B shows that the sheet conveyance direction is determined to be the B direction by the intensity compliance determination process when the following seventh determination condition and eighth determination condition are satisfied. The seventh determination condition is a condition that the intensity of RSSI of the response radio wave in the first direction in the first period is stronger than the intensity of RSSI of the response radio wave in the first direction in the second period. The eighth determination condition is a condition that the intensity of RSSI of the response radio wave in the second direction in the first period is weaker than the intensity of RSSI in the second direction in the second period.

The RFID reader 1 in the aforementioned embodiments receives the response radio wave at least once in each polarization direction in each period. The RFID reader 1 determines the orientation of the sheet based on the intensity of the received radio wave in each polarization direction. The level measurement circuit 113, the reading frequency counter 114, the computing device 111, and the storage device 112 do not detect the position of the RFID tag on the sheet, but determine the orientation of the sheet based on the intensity of the radio waves in each polarization direction. The RFID tag does not necessarily have to be provided at the edge of the sheet. Since the RFID tag does not need to be provided at the edge of the sheet, the flexibility is improved in choosing a location of the RFID tag arranged on the sheet.

The RFID reader 1 described above does not necessarily have to be provided in the image processing apparatus 9. The RFID reader 1 may be provided on any device as long as it can communicate with the RFID tag provided on the sheet being conveyed.

The RFID tag is an example of a wireless tag and the RFID reader is an example of a wireless tag communication device. The wireless tag may be any tag as long as it is capable of wirelessly transmitting and receiving information to and from a communication destination device and operates using radio waves transmitted from the communication destination device as electric power. The wireless tag communication device may be any device as long as it can wirelessly transmit and receive information to and from the wireless tag.

The RSSI is an example of reception intensity. The time series origin of the RSSI is an example of the origin in a time axis direction.

The functions of the RFID reader 1 in the above-described embodiments may be performed by a computer. In such a case, the program(s) for performing those functions may be recorded in a computer-readable recording medium and the program recorded in this recording medium may be read by a computer system and executed. The "computer system" mentioned here includes an Operating System (OS) and hardware such as peripheral devices. The "computer-readable recording medium" refers to a portable medium such as a flexible disk, a magneto-optical disk, a ROM, a CD-ROM, or a storage device such as a hard disk built in a computer system. Further, the "computer-readable recording medium" includes a medium which holds a program(s) for a certain period of time, such as a volatile memory inside a computer system which serves as a server or a client. Further, the above-mentioned program(s) may be ones for performing some of the above-mentioned functions and may be ones that can perform the above-mentioned functions in combination with a program(s) already recorded in the computer system.

According to at least one embodiment described above, by having the determination circuit 108, it is possible to improve the flexibility in choosing the location where an RFID tag is arranged on a sheet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
   a printing unit configured to print an image on a sheet including first and second wireless tags, wherein the first and second wireless tags have first and second antennas extending along first and second directions, respectively; and
   a wireless tag reading unit including a third antenna and configured to:
      transmit, towards the sheet from the third antenna, first radio waves polarized in the first direction and second radio waves polarized in the second direction in each of a first period during which the sheet is conveyed towards the third antenna and a second period during which the sheet is conveyed away from the third antenna, and
      determine an orientation of the sheet based on intensities of third radio waves polarized in the first direction and fourth radio waves polarized in the second direction, which have been received by the third antenna in each of the first and second periods.

2. The image processing device according to claim 1, wherein the wireless tag reading unit determines the orientation based on numbers of the third and fourth radio waves, the intensities of which are greater than or equal to a threshold value.

3. The image processing device according to claim 2, wherein each of the numbers of the third and fourth radio waves received in one of the first and second periods is one.

4. The image processing device according to claim 1, wherein the first direction is perpendicular to the second direction.

5. The image processing device according to claim 4, wherein
   the first direction is perpendicular to a sheet conveyance direction,
   the first wireless tag is located closer to one end of the sheet in the second direction, and
   the wireless tag reading unit is configured to determine that the sheet is conveyed along the second direction from said one end of the sheet when the number of the third radio waves in the first period is greater than the second period, and the number of the fourth radio waves in the first period is less than the second period.

6. The image processing device according to claim 5, wherein the wireless tag reading unit determines that the sheet is conveyed along the second direction from the other end of the sheet when the number of the third radio waves in the first period is less than the second period, and the number of the fourth radio waves in the first period is greater than the second period.

7. The image processing device according to claim 1, wherein the wireless tag reading unit transmits the first and second radio waves alternately during each of the first and second periods.

8. The image processing device according to claim 1, wherein the printing unit prints the image on the sheet according to the orientation determined by the wireless tag reading unit.

9. The image processing device according to claim 8, wherein the printing unit is further configured to change an orientation of the image to be printed on the sheet when the orientation determined by the wireless tag reading unit is inconsistent with an orientation specified for the printing in advance.

10. The image processing device according to claim 1, wherein the third antenna is disposed downstream of the printing unit in a sheet conveyance direction.

11. A method for determining an orientation of a sheet including first and second wireless tags having first and second antennas extending along first and second directions, respectively, the method comprising:
transmitting, towards the sheet from a third antenna, first radio waves polarized in the first direction and second radio waves polarized in the second direction in each of a first period during which the sheet is conveyed towards the third antenna and a second period during which the sheet is conveyed away from the third antenna; and
determining an orientation of the sheet based on intensities of third radio waves polarized in the first direction and fourth radio waves polarized in the second direction, which have been received by the third antenna in each of the first and second time periods.

12. The method according to claim 11, wherein the orientation is determined based on numbers of the third and fourth radio waves, the intensities of which are greater than or equal to a threshold value.

13. The method according to claim 12, wherein each of the numbers of the third and fourth radio waves received in one of the first and second periods is one.

14. The method according to claim 11, wherein the first direction is perpendicular to the second direction.

15. The method according to claim 14, wherein
the first direction is perpendicular to a sheet conveyance direction,
the first wireless tag is located closer to one end of the sheet in the second direction, and
the determination of the orientation includes determining that the sheet is conveyed along the second direction from said one end of the sheet when the number of the third radio waves in the first period is greater than the second period, and the number of the fourth radio waves in the first period is less than the second period.

16. The method according to claim 15, wherein the determination of the orientation includes determining that the sheet is conveyed along the second direction from the other end of the sheet when the number of the third radio waves in the first period is less than the second period, and the number of the fourth radio waves in the first period is greater than the second period.

17. The method according to claim 11, wherein the first and second radio waves are transmitted alternately during each of the first and second periods.

18. The method according to claim 11, further comprising:
printing an image on the sheet according to the determined orientation.

19. The method according to claim 18, wherein the printing includes changing an orientation of the image to be printed on the sheet when the determined orientation is inconsistent with an orientation specified for the printing in advance.

20. A sheet, comprising:
a sheet body on which an image can be formed;
a first RFID tag arranged closer to one end of the sheet body and configured to transmit radio waves polarized in a first direction; and
a second RFID tag arranged closer to another end of the sheet body, which is opposite to said one end of the sheet body, and configured to transmit radio waves polarized in a second direction different from the first direction.

* * * * *